Oct. 31, 1950     L. E. LA BRIE     2,527,886
MASTER CYLINDER
Filed Dec. 28, 1948

INVENTOR.
LUDGER E. LABRIE.
BY
*Clifford C. Bradbury*
ATTORNEY

Patented Oct. 31, 1950

2,527,886

UNITED STATES PATENT OFFICE 2,527,886

MASTER CYLINDER

Ludger E. La Brie, Detroit, Mich., assignor to Hydraulic Brake Company, Detroit, Mich., a corporation of California Application December 28, 1948, Serial No. 67,697

3 Claims. (Cl. 60—54.6)

This invention relates to master cylinders for hydraulic brake systems.

In accordance with this invention, a tiltable valve is located in a passageway between the bore of the master cylinder and the reservoir mounted above it.

It is the object of this invention to arrange this valve so that it may be inserted in its position with the piston in its normal position in the cylinder.

In accordance with the invention as shown and described in my application, Serial No. 27,389, filed May 17, 1948, for Master Cylinders, the piston must be moved slightly away from its normal position in order for the tilting valve and its housing to be threaded into position in the opening between the reservoir and the cylinder, this being because the end of the stem of the tilting valve strikes upon the outer cylindrical surface of the piston flange, which serves to operate the valve, unless the flange is moved out of the way.

In accordance with my present invention, the end of the stem of the valve to be tilted, and the surface of the piston flange which serves to tilt the valve, are tapered so that when the valve and its housing are inserted in the opening between the reservoir and the piston, the inner end of the valve stem strikes upon a sloping surface and is guided into tilted position.

My invention is illustrated in the accompanying drawing, in which

Figure 1:
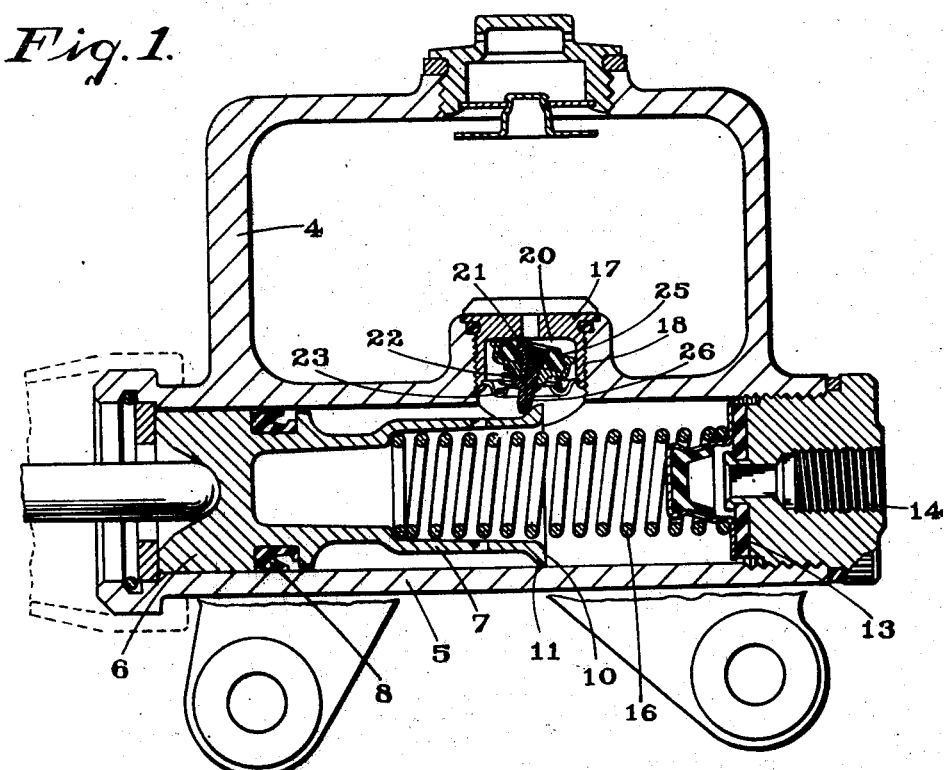
Figure 2:
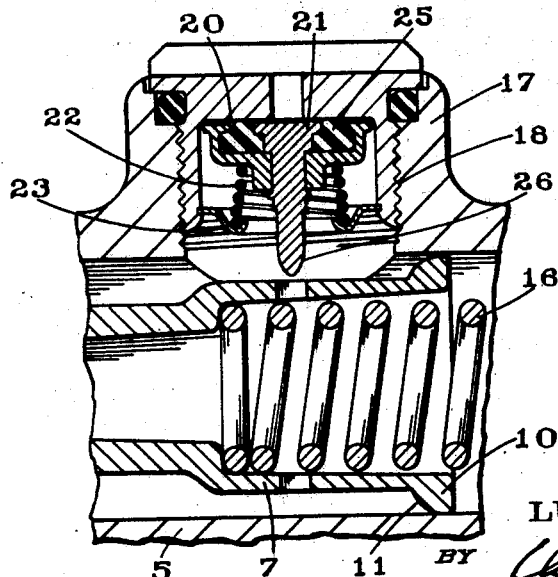

Fig. 1 is a section through a combined cylinder and reservoir, and through the valve of my invention in its tilted position, and Fig. 2 is a section through a part of the cylinder, and through the valve in its seating position.

In the illustrated embodiment of my invention, the reservoir 4, and cylinder 5, are integrally cast with the reservoir immediately above the cylinder. A piston 6, having a tubular extension 7, is mounted within the cylinder and is suitably sealed by a packing 8 for placing fluid under pressure when the piston is moved to the right by any suitable power. At the inner end of the tubular piston extension 7, is a flange 10, provided with a beveled or sloping surface 11. A valve mechanism 13, for permitting fluid to flow both out of and into the cylinder through the opening 14 to wheel cylinders not shown, or other devices to be operated by fluid under pressure, is held on its seat by a spring 16, which serves also to urge the piston 6 in its normal position to the left in Fig. 1 of the drawing.

A plug 17 is threaded into an opening 18 between the reservoir and the cylinder. The hollow underportion of the plug 17 forms the housing and seat 20 for a valve 21, the head of which is held against its seat by a spring 22, seating in a spider 23, stacked into a groove at the lower end of the hollow plug 17. The head of the valve 21 is provided with a rubber facing 25, locked onto the valve seat by inwardly and outwardly facing flanges on the rim and on the separate central portion respectively.

The central portion of the valve member has a stem 26 which passes through an opening at the center of the valve head, and extends into the cylinder where it is engageable by the flange 10 and beveled surface 11 of the piston extension 7 when the piston is in its normal position. The lower end of the valve stem 26 is tapered and rounded so that when screwing the plug 17 into position in its opening 18, the sloping part of the end 26 of the valve stem will engage the beveled part 11 of the flange 10 on the piston, causing the valve to tilt on its seat as the plug 17 is screwed to position. By this construction, damage to the tilting valve, or its clamping between the flange on the piston extension and the valve seat are avoided.

In operation, the cylinder, reservoir, tubing and wheel cylinders, or other devices to be operated by fluid pressure, are first filled with fluid in the usual manner of bleeding and pumping. Thereafter, when the piston rests in its normal position, the valve 21 is maintained open by tilting, but when the piston 6 is moved from its normal position, only a very slight distance, the valve 21 is permitted to straighten the spring 22, pressing the rubber facing 25 against the seat to prevent the escape of fluid from the cylinder to the reservoir during the pressure stroke of the piston. Upon the return of the piston to its normal position, the superior strength of the spring 16 over the spring 22 causes the valve 21 to be tilted on its seat to open the passageway between the cylinder and the reservoir.

In assembling the piston and valve, the piston is first inserted in the cylinder, after which the valve housing with its valve in place may be screwed to position without damage to the valve, since the valve will be tilted by contact between the tapered end of its stem and the beveled edge of the flange 10. The valve housing plug 17 may be removed and replaced for inspection or repairs without moving the piston away from its normal position.

While I have shown and described my invention with respect to certain details of construction, it is to be understood that these may be varied considerably without departing from the spirit or scope of my invention.

I claim:

1. In a master cylinder for hydraulic brake systems, a combined cylinder and reservoir, a piston in the cylinder, a spring in the cylinder for returning the piston to its normal position, there being a passageway from the reservoir into the cylinder beyond the pressure stroke of the piston, a valve for closing said passageway opening toward the cylinder and having a stem projecting into the cylinder, a spring tending to hold said valve on its seat, the piston being provided with an integral extension of less diameter than the cylinder and provided with a flange at its extremity tapering inwardly from substantially the internal diameter of the cylinder toward the piston and adapted to engage the stem of said valve to tilt the valve when the piston and the flange are in their normal positions, an abutment independent of the valve stem for stopping the flange in its normal position the taper on said flange serving to tilt the valve on its seat when the valve is inserted in position and when the flange is in its normal position in the cylinder so that the valve may be removed and replaced with the piston and its flange in their normal positions.

2. In a master cylinder for hydraulic brake systems, a reservoir integrally connected with the cylinder, there being a threaded passageway between the reservoir and the cylinder, a valve structure including a valve head and valve seat opening toward the cylinder adapted to be threaded into the opening from the reservoir side toward the cylinder, a stem for the valve head extending into the cylinder, a piston in the cylinder, and a flange movable therewith and having a tapering face for contacting the stem of said valve to tilt the valve when the piston moves to its normal position, an abutment for the piston independent of the valve stem to stop the flange in its normal position the taper of said flange extending beyond the center line of said valve stem so that when the valve structure is threaded into the opening between the reservoir and the cylinder and the piston is in its normal position, the end of the valve stem will engage the taper of said flange to tilt the valve as it is moved inwardly in assembling.

3. In a combined master cylinder and reservoir, a piston in the cylinder, there being an opening between the reservoir and the cylinder beyond the pressure stroke of the piston, a valve structure adapted to be inserted in the opening from the reservoir side and having a seat and head opening toward the cylinder and a stem integral with the head protruding into the cylinder, the end of said valve stem being tapered, a tapered flange in the cylinder movable with the piston and located beneath said valve structure when the piston is in its normal position, and abutment for stopping the piston in said position when the valve structure is not inserted in its opening, the taper of the valve stem and the taper of the flange contacting one another when the valve structure is inserted in the opening to tilt the valve stem to one side.

LUDGER E. LA BRIE.

REFERENCES CITED

The following references are of record in the file of this patent:

UNITED STATES PATENTS

| Number | Name | Date |
|---|---|---|
| 2,095,752 | La Brie | Oct. 12, 1937 |

FOREIGN PATENTS

| Number | Country | Date |
|---|---|---|
| 539,095 | Great Britain | Aug. 27, 1941 |